Dec. 30, 1930.  H. GOPOLD  1,787,195
CIRCULAR SAW MACHINE
Filed Oct. 4, 1929
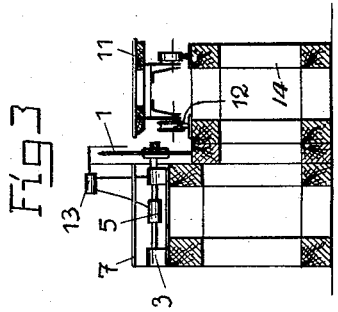
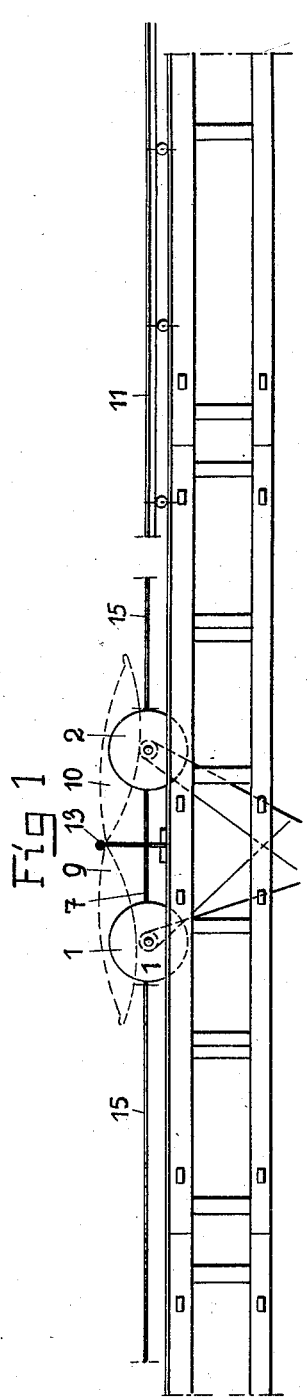
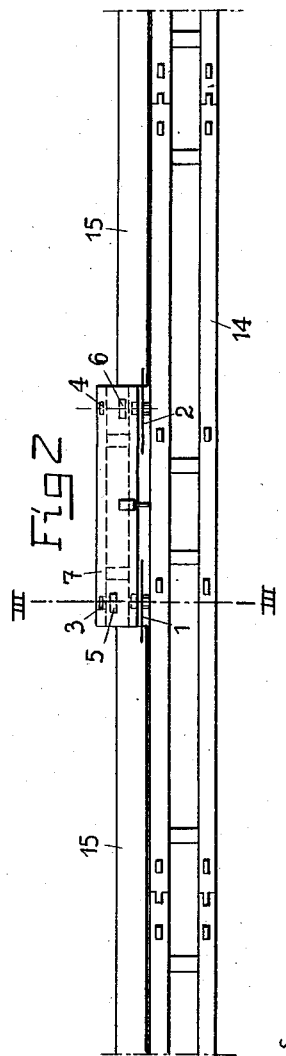

Patented Dec. 30, 1930

1,787,195

UNITED STATES PATENT OFFICE

HUBERT GOPOLD, OF ZUBAK, CZECHOSLOVAKIA

CIRCULAR-SAW MACHINE

Application filed October 4, 1929, Serial No. 397,305, and in Czechoslovakia May 3, 1928.

My invention relates to circular saws for edging or dressing boards, in which the board is moved past the saw by means of a carriage supported on rails.

Heretofore, the carriage on which the boards to be operated on are placed, had to be returned each time after one edge of the boards was dressed, to permit the board to be turned over to present the other edge to the saw, as the carriage was again moved past the saw.

The object of the present invention is to do away with this time-consuming operation and to produce a machine in which upon the return of the carriage the second edge of the board is dressed, so that the return movement of the the carriage is utilized to complete the dressing of the board.

In order to accomplish this object, I provide two circular saws disposed in the same vertical plane and rotating in opposite directions. In this way, a board can be dressed along both edges in one operation, that is, while the carriage on which the board is placed is moved back and forth past the two circular saws. All that the operator has to do is to turn the board on the carriage, after the same has travelled past the circular saws in one direction. Obviously, by this arrangement the output is doubled.

As to a complete understanding of my invention, I make reference to the appended drawing wherein, by way of illustration, I have shown one embodiment of the invention, and wherein Fig. 1 is a side elevation of the machine; Fig. 2 a top plan view of the same, and Fig. 3 a transverse section along line III—III in Fig. 2.

As will be seen from the drawing, there are provided two circular saws indicated at 1 and 2, mounted on the projecting free ends of arbors suitably journalled in bearings shown at 3 and 4. The arbors also carry the pulleys 5 and 6 respectively. The circular saws 1 and 2 are arranged in the same vertical plane, or in line with each other, and with a sufficient space between them to permit the mounting of a standard shown at 13 for supporting the hoods 9 and 10 acting as guards for the circular saws. As shown in Fig. 1, the hoods at their ends are upwardly bent so that as the boards to be dressed abut against the guards, the latter will be raised to drop back to their original position by gravity, as soon as the board has passed the corresponding saw.

At 7 is shown the table on which the saws and the hoods are mounted. The saws are driven so as to rotate in opposite directions, the rotation of the saws being outward.

At 11 is shown the movable carriage provided with rollers 12 and 12' which rest on rails fastened on a long frame shown at 14. The rollers 12 on the inside of the carriage 11 are grooved.

At 15 and 15' are shown auxiliary tables which are provided to facilitate the turning of the boards.

As the carriage 11 travels past the circular saws in one direction, the board resting on said carriage is dressed along one edge by the outwardly rotating saw 1. When the dressing of the edge is complete, the board is turned on the carriage 11 so as to present the other edge of the board to the outwardly but oppositely rotating circular saw 2, so that upon the return movement of the carriage 11 the other edge of the board is also dressed.

Any desired source of power can be used for rotating the two circular saws in opposite directions by means of the pulleys 5 and 6 mounted on the arbors of the two saws. The two saws, however, may also be directly driven by means of separate electro-motors coupled with the arbors of the saws.

As the drawing is only an illustration of my invention, I do not, of course, limit myself to the construction shown therein.

I claim:

In combination, a saw table, two laterally spaced circular saws mounted on said table in a common vertical plane and with their axes disposed in a common horizontal plane, the teeth of said saws being pitched outwardly relative to one another, means for rotating said saws in opposite directions outwardly relative to one another, said saw table being disposed at one side of said saws, a carriage frame disposed at the other side of said saws, a carriage mounted for movement along said carriage frame across the saws, the top of said carriage being disposed in a common horizontal plane with the top of said saw table, and saw table extensions at the ends of said saw table having their tops disposed in a common horizontal plane with the top of said saw table and the top of said carriage.

In testimony whereof I affix my signature.

HUBERT GOPOLD.